F. G. FOSS.
APPARATUS FOR PNEUMATIC CAN DRYING.
APPLICATION FILED MAR. 3, 1919.

1,361,039. Patented Dec. 7, 1920.
4 SHEETS—SHEET 1.

F. G. FOSS.
APPARATUS FOR PNEUMATIC CAN DRYING.
APPLICATION FILED MAR. 3, 1919.

Patented Dec. 7, 1920.

F. G. FOSS.
APPARATUS FOR PNEUMATIC CAN DRYING.
APPLICATION FILED MAR. 3, 1919.
1,361,039.
Patented Dec. 7, 1920.
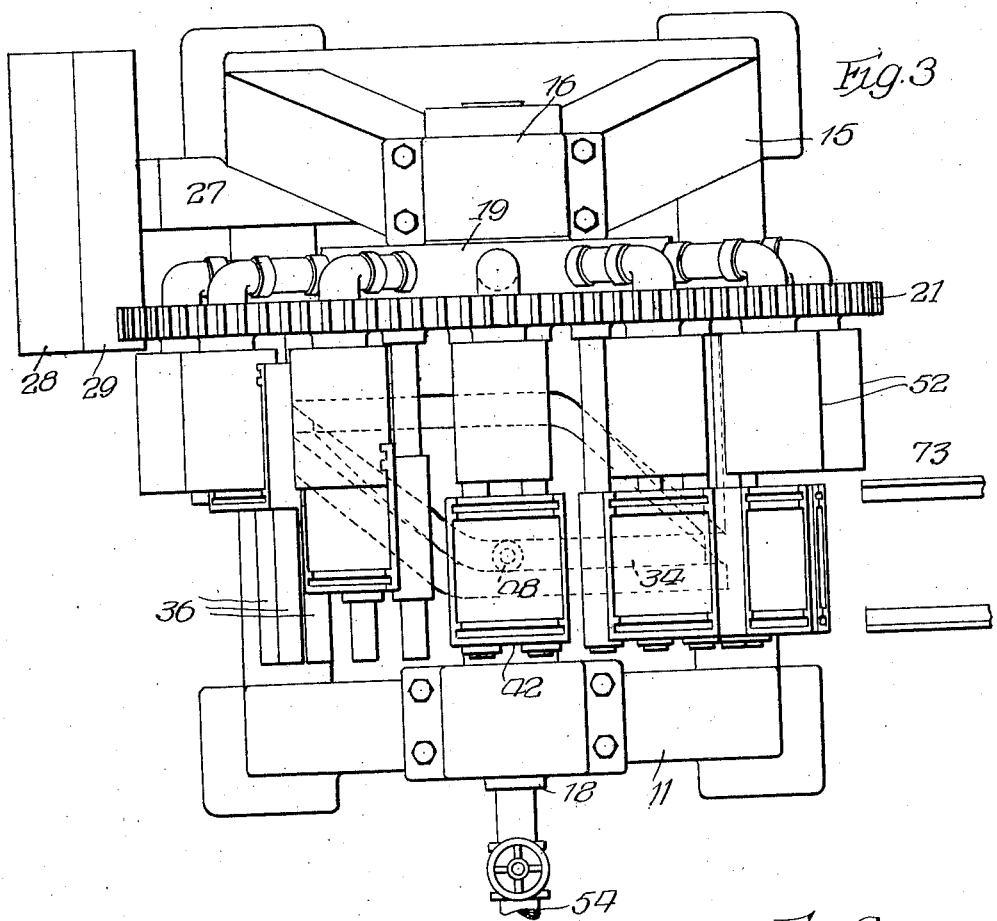
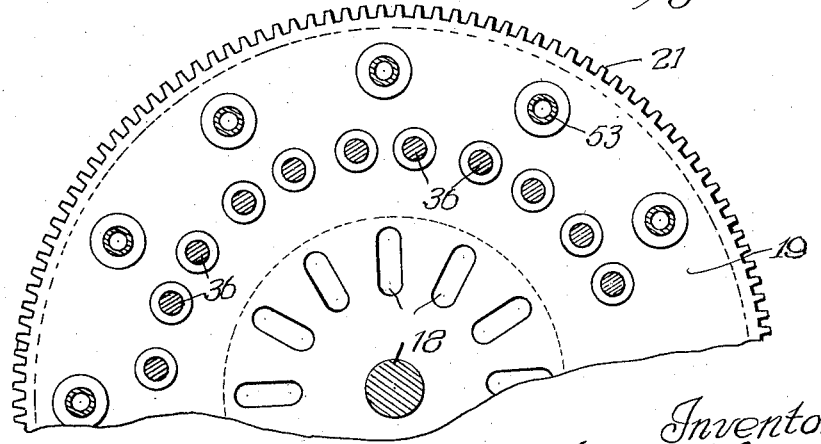

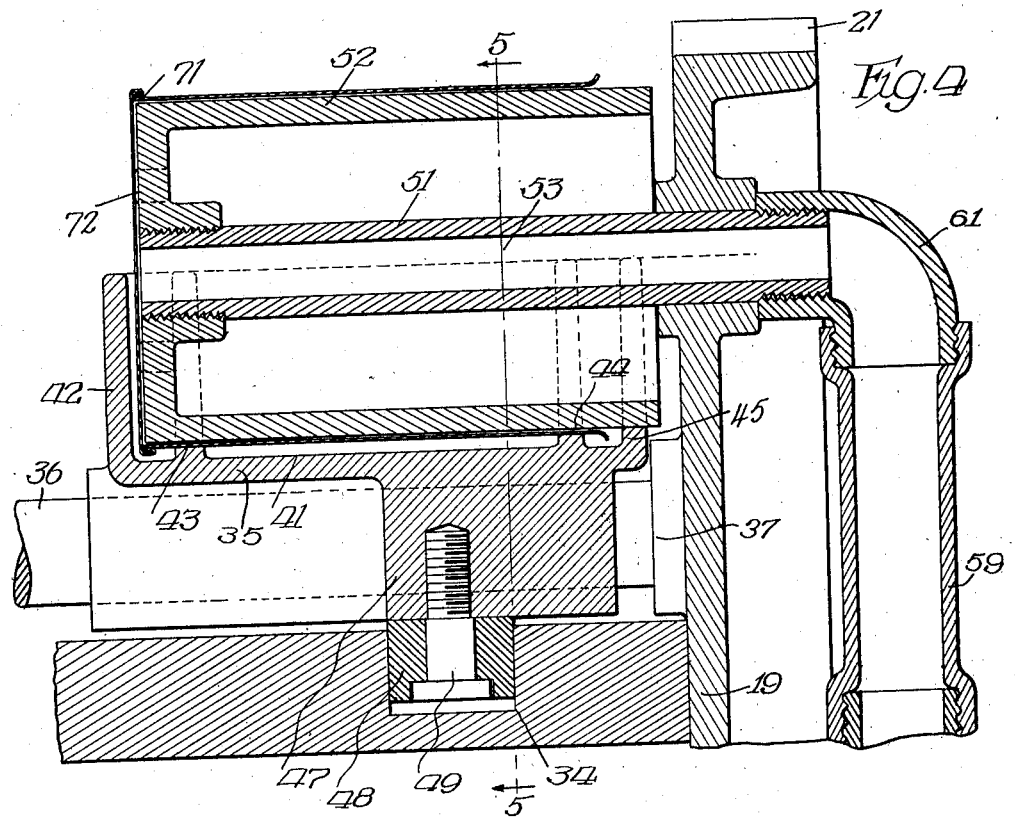
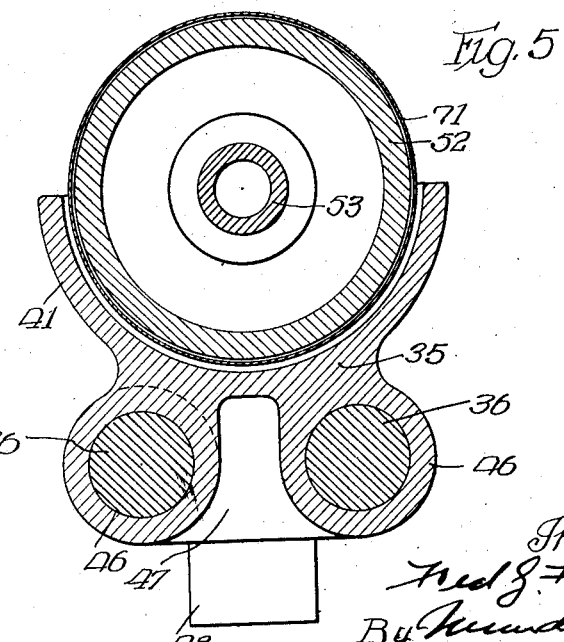

UNITED STATES PATENT OFFICE.

FRED G. FOSS, OF NEWARK, NEW JERSEY, ASSIGNOR TO AMERICAN CAN COMPANY, OF NEW YORK, N. Y., A CORPORATION OF NEW JERSEY.

APPARATUS FOR PNEUMATIC CAN-DRYING.

1,361,039.

Specification of Letters Patent.

Patented Dec. 7, 1920.

Application filed March 3, 1919. Serial No. 280,495.

*To all whom it may concern:*

Be it known that I, FRED G. FOSS, a citizen of the United States, residing in Newark, in the county of Essex and State of New Jersey, have invented a new and useful Improvement in Apparatus for Pneumatic Can-Drying, of which the following is a specification.

This invention relates in general to driers for cans and other articles for which the invention may be usable, and has for its principal object the provision of a simple, rapid, automatic drier which will be usable for the drying of cans at high speed after they have been sterilized and cleaned, as for example by steaming or hot water.

A further object of the invention is the provision of an apparatus of this kind of strong and durable character without delicate parts that will require frequent repair or replacement and which will not require specially trained and skilled attendants.

Numerous other objects and advantages of the invention will be apparent as it is better understood from the following description when considered in connection with the accompanying drawing illustrating a preferred embodiment thereof.

Referring to the drawings,

Fig. 3 is a top plan view thereof.

Fig. 4 is an enlarged partial view similar to Fig. 1 and showing the relative position of parts of the apparatus at the completion of the drying operation.

Fig. 5 is a section taken substantially on the line 5—5 of Fig. 4, and

Fig. 6 is a partial section of Fig. 1 taken at the plane indicated in Fig. 1.

Figure 1:
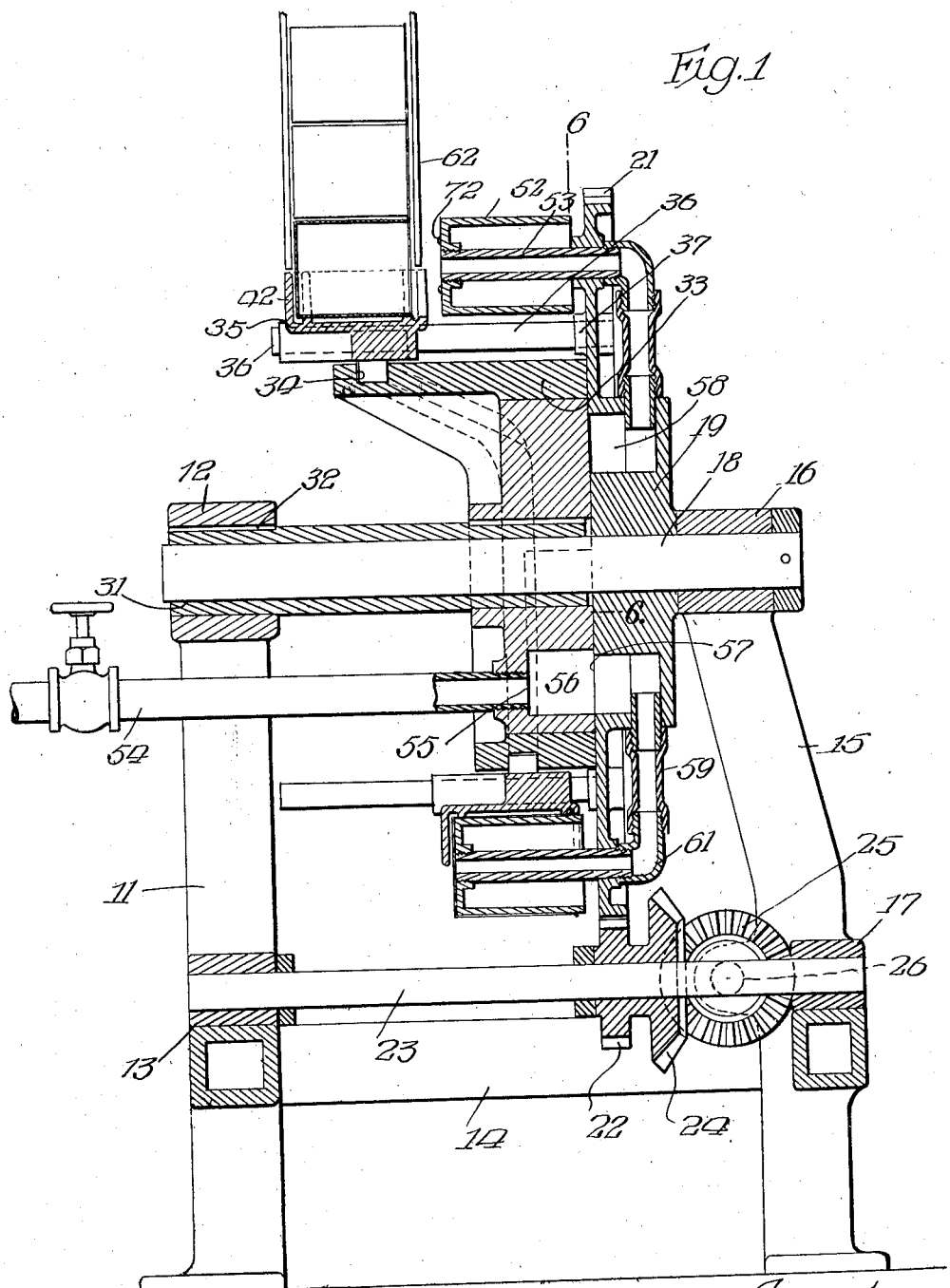
Figure 1 is a vertical section taken through an apparatus embodying my present invention.

For the purpose of illustrating my invention, I have shown in the drawing an apparatus embodying it which will be presently described. It might, however, be well to mention before entering upon a detailed description of this apparatus, to explain the general operation of this illustrative machine.

In it cans are delivered automatically and continuously from a suitable chute to a rotating turret or wheel provided with a number of holders or can supports which receive the cans as they are delivered into the apparatus. Adjacent these holders is mounted a second rotating turret upon which are provided a number of plungers over which in the movement of the apparatus the holders carry the cans at a desired rate of speed. Air is forced through or drawn into these plungers which are of a size only slightly smaller than the can body, so that this air forced into or withdrawn from the can is compelled to pass through a restricted passage located between the outer face of the plunger and the inner surface of the can.

This passageway is preferably sufficiently small to cause the air to pass at sufficient velocity to dry the can during the movement of the plunger into it, although from certain aspects of the invention this of course is not necessary because the can body must be again moved off the plunger and during this operation if desired some of the drying might be done. The drying, in any event, is progressive and is preferably confined to the inward movement of the plunger. It will however be readily apparent that the apparatus may be changed in a considerable number of ways without departing from the invention.

Describing now the apparatus in detail, reference character 11 indicates a yoke having a shaft bearing 12 at its upper end and a shaft bearing 13 therebeneath, connected by cross members 14 with a companion yoke 15, also having bearings 16 and 17 in alinement with bearings 12 and 13. A shaft 18 is provided to extend through the bearings 12 and 16, and this shaft carries upon it a turret or wheel 19 which moves with the shaft. The outer circumferential edge of this turret is provided with gear teeth 21 meshing with a pinion 22 upon a shaft 23 in bearings 13 and 17. The pinion 22 is connected with a beveled gear 24 upon this shaft 23 which beveled gear in turn meshes with the companion gear 25 upon a power shaft 26 having an elongated bearing 27 upon the cross frame 14 and carrying at its outer end fast and loose pulleys 28 and 29. The power therefore applied to shaft 26 through the beveled gears 25 and 24 and then through pinion 22 imparts motion to the turret or wheel 19. Upon the shaft 18 a sleeve 31 is mounted and extends through the bearing 12 and this sleeve is held against rotation by a spline or key 32. A cam member 33 is fixed upon the sleeve 31 and has a cam slot 34 for controlling the movement of a plurality of can holders or supports 35. Each of these can holders is mounted upon a pair of rods 36 fixed at one end at 37 in the turret or wheel 19 and extending out in parallelism with the axis of the wheel. The can holders are all substantial duplicates of each other and a detailed description of one of them will be sufficient for an understanding of the others.

Referring more particularly to Figs. 4 and 5, it will be noted that each can holder consists of a semi-cylindrical body 41 having an end web 42 at its outer end and having internal ribs 43 and 44 adapted to engage the outer surface of the can body and near the ends thereof. At the inner end each holder 41 is provided with a rib 45. The semi-cylindrical body 41 is provided with a pair of sleeves 46 formed integrally with the body and located beneath it, through which are disposed the two rods 36 extending out from the wheel 19. Between these sleeves is a boss 47 and a roller 48 is supported from this boss by a screw pin 49 extending through the roller and into a suitable threaded aperture in the boss. The roller 48 moves in the cam groove 34 and causes the can holder to move out and in with respect to the wheel, as is desired during the operation of the apparatus.

Extending out from the wheel are provided a plurality of hollow shafts or sleeves 51, one of which is located at each holder and is arranged with its central axis coincident with the axis of curvature of the cylindrical part of the holder. Each of these sleeves carries at its outer end a plunger or body 52 of the shape of the can to be placed in the holder having a size appropriate to cause it to enter into the can and leave a slight clearance or space between its outer surface and the inner surface of the can body. This clearance may be as little as a few one-thousandths of an inch. During the operation of the device the cans are deposited in the holders and each holder is then moved toward the wheel bringing the plunger 52 into the can, the movement continuing until the free end of the plunger approaches close to the bottom of the can.

The space between the plunger and the can body wall is utilized as an air passage and means are provided to cause air movement through this passage to effect the drying action. This air movement may be either by suction of air from the outside through the can and into the passageway 53 within the hollow shaft 51 or it may be by means of air forced through the opening 53 in the hollow shaft 51 and then out from the passage between the plunger and can. The air movement is produced by suitable suction or pressure exerted through a pipe 54 opening at 55 into an arcuate chamber 56 (Fig. 1) provided in the body of the cam member 33.

The chamber 56 is open at one side at 57 throughout its length, and in the wheel are provided pockets 58, one for each holder and plunger arrangement. Each of these pockets is indicated by a pipe 59 with the coupling 61 connected to the hollow shaft 51 of the plunger.

It is thus seen that throughout the movement during which the opening of the pocket 58 is in communication with the chamber 56 there will be created an air impelling force either into or out of the can that, as will be later described more in detail, produces the actual drying.

Figure 2:
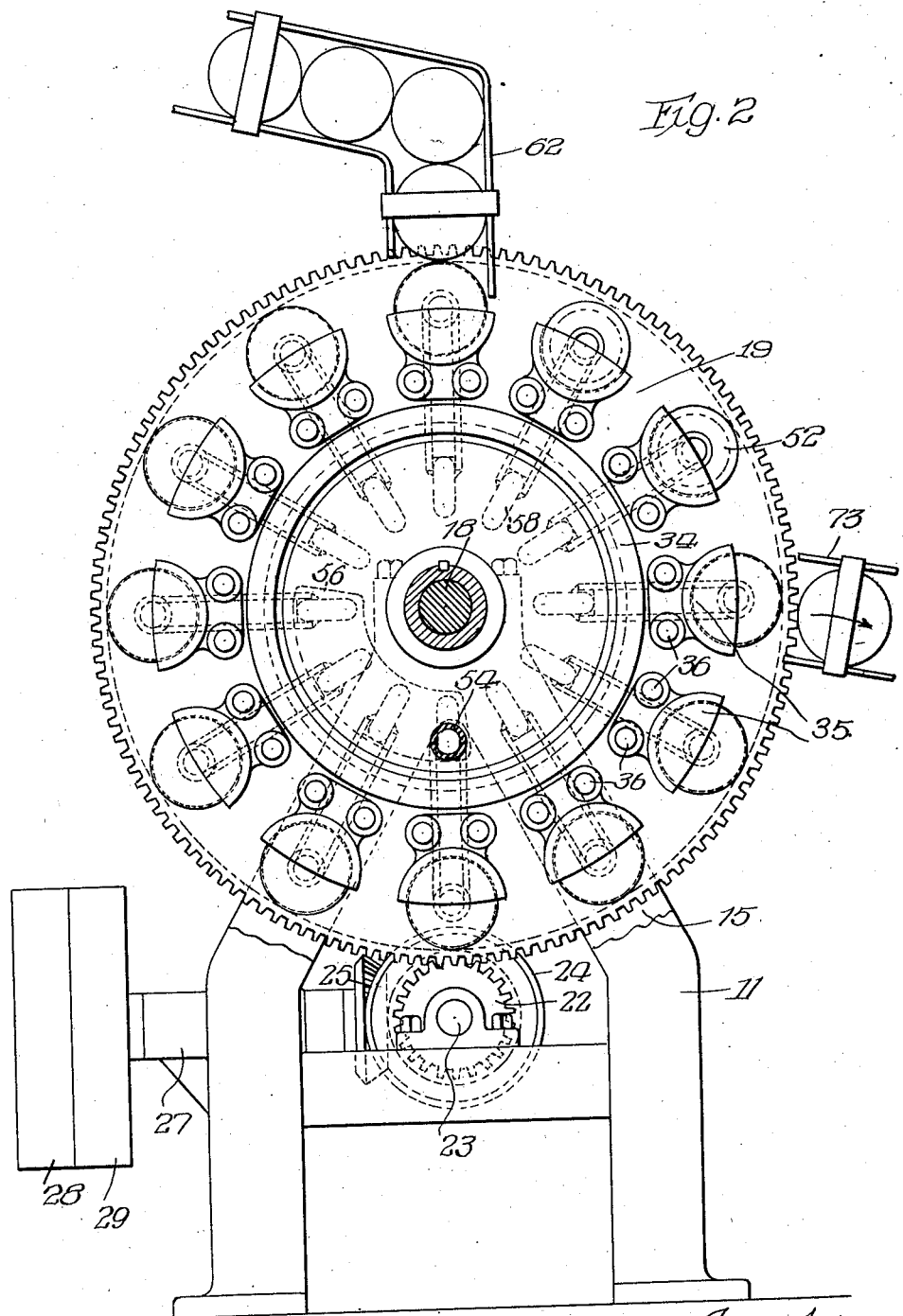
Fig. 2 is a side elevation of the same.

Referring now to Fig. 2, it will be noted that a suitable feed 62 is provided at one point in the travel of the apparatus for automatically delivering cans to the holder. In the illustrative embodiment of the invention shown on the drawing, the feeding station is located at the top of the apparatus so that the cans enter by gravity into the pockets, the spacing of the holders being appropriate to cause the cans to enter accurately into the holders. Immediately upon the entrance of the cans into the pockets the holder is caused to approach the plunger and by the time the plunger has entered a short way into the can the air action is started by the establishment of communication between the hollow shaft and the air chamber or chest in the cam member. The air application is thus started before the plunger has moved an appreciable distance into the can, and rapidly moving air is thus caused to pass between the portion of the can wall extending about the plunger and the plunger itself. The action of this air is effected very rapidly, drying this part of the can wall, and the forward movement of the plunger progressively dries the wall as it nears the bottom. The outer edges 71 of the plunger are preferably sharp so that the current of air when the can is substantially entirely upon the plunger, as shown in Fig. 4, will be directed into the seam at the bottom and dry this portion also.

It has been found in practice that very rapid drying may be accomplished by such an apparatus and that the rate of this drying depends upon the size of the space about the plunger. The end web 42 of the holder acts to hold the can against outward movement where the air is forced in through the shaft 51, and projections formed by pins 72 are provided in the end of the plunger to hold the cans against too close contact with the outer face of the plunger when suction is applied to draw the air in the opposite direction. The rib 45 acts as an efficient stripper for the can in withdrawing the plunger, and this rib may be formed as shown to approach in close proximity to the outer face of the plunger in order that unflanged cans and the like may be property operated upon. The cans are automatically discharged into a chute 73 located well around the circumference from the feed chute 62 into which the can rolls after the holder has been withdrawn from the plunger (Fig. 3).

The action of the apparatus is to concentrate a rapid flow of air in contact with a relatively small area of can surface and to advance the effective area of the can surface as the flow of air dries preceding portions. By changing the locality, on the can-surface, of the restriction of the air current the most rapid and violent portion of the current consists of fresh and dry air, and the moisture is progressively encountered by dry air as distinguished from moisture laden air which has already acted on a moist can-surface. If desired the air may be sterilized and washed before being introduced into the can, and in any event traveling at relatively high velocity it materially helps toward the sterilization and cleaning of the can by its action upon portions of the can after they are dried.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I do not claim herein the process disclosed, the same being the subject of my companion application Serial No. 280,496, filed March 3, 1919.

I claim:

1. In a drying apparatus for cans and the like, the combination of a holder for the can, and means including a plunger which nearly occupies the space within the can for progressively drying the body of the can from one end to the other.

2. In a drying apparatus for cans and the like, the combination of a holder for the can, means progressively drying the body of the can from one end to the other, and means entering into the can and restricting an air flow therethrough as described and progressively drying the can upon movement lengthwise thereof.

3. In a drying apparatus for cans and the like, the combination of a holder for the can and means including a plunger which nearly occupies the space within the can for progressively drying the can upon movement lengthwise thereof.

4. In a drying apparatus for cans and the like, the combination of a holder for the can, and means entering into the can and progressively drying the same by localized drying action over a shifting restricted area.

5. In a drying apparatus for cans and the like, the combination of a holder for the can and means for producing a current of air in contact with a restricted area of the can surface to be dried, and means for varying said area during the action of said current.

6. In an apparatus for drying cans and the like, the combination of a holder for the can to be dried, means for applying a localized moving current of air about a restricted area extending around the can surface to be dried, said means shifting said current of air to successive areas to progressively dry said can.

7. In an apparatus for drying cans and the like, the combination of a can holder, means for forming a restricted air passage formed at one side by the area of the cans to be dried, and means for producing air movement through said passage.

8. In an apparatus for drying cans and the like, the combination of a holder for a can and a body movable within the can and leaving a restricted space between itself and the inner face of the can, and means for moving air through said space, and can moving means for inverting the can during said moving of the air.

9. In an apparatus for drying cans and the like, the combination of a holder for a can and a body movable within the can and leaving a restricted space between itself and the inner face of the can, and means for moving air through said space, said body being movable progressively into the can to progressively dry the can with said moving air.

10. In an apparatus for drying cans and the like, the combination of a holder and a suction member for drawing air into the can and means for confining the incoming air to a restricted wet or damp area of said can.

11. In an apparatus for drying cans and the like, the combination of a moving conveyer for conveying cans while in the apparatus, and means for successively drying the cans by moving air while said cans are moving with said conveyer.

12. In an apparatus for drying cans and the like, the combination of a holder, means for drying the cans by the movement of air in contact with the surface to be dried, and means for restraining the can against movement by the action of said air moving means.

13. In an apparatus for drying cans and the like, the combination of a conveyer for moving cans and the like in said apparatus, means for drying the cans by moving air currents, and means for automatically discharging the cans when dry from said apparatus.

14. In an apparatus for drying cans and the like, the combination of a conveyer for moving cans and the like in said apparatus, means for drying the cans by moving air currents, means for occupying space within the cans to restrict the air currents, and means automatically conveying the cans into drying position.

15. In an apparatus for drying cans and the like, the combination of a conveyer for moving cans while in said apparatus, air drying means acting upon the can moving with said conveyer, and means for rendering said air drying means inoperative during a portion of the movement of the cam and while said drying means are in operative relation therewith.

16. In an apparatus for drying cans and the like, the combination of a holder and drying plungers movable into the can, means for carrying the holder and can sidewise, and means for automatically positioning the can while in said holder over said drying plunger.

17. In an apparatus for drying cans and the like, the combination of a holder and drying plungers movable into the can, and means for automatically positioning the can while in said holder over said drying plunger and as the drying progresses.

18. In an apparatus for drying cans and the like, the combination of a holder and drying plunger insertible into a can in the holder, and means for moving the can on said plunger during said drying operation.

19. In an apparatus for drying cans and the like, the combination of a holder, a plunger insertible into a can in the holder and of slightly less size than the can, and a conduit for taking air into or away from said plunger to cause the current of air to pass between the plunger and the surface of the can being dried, to dry said surface, and means for conveying the plunger and can during said operation.

20. In an apparatus for drying cans and the like, the combination of a holder, means insertible into the can in the holder and movable therein to progressively dry the can, a conduit connecting with said means for admitting air under pressure to produce said current of air, and means for cutting off said air until the said insertible means enters the can.

21. In an apparatus for drying cans and the like, the combination of a holder, means insertible into the can in the holder and movable therein to progressively dry the can, and a conduit for withdrawing air by suction.

22. In an apparatus for drying cans and the like, the combination of a holder, means for introducing and moving air in a can in the holder for drying, and means for reducing the interior space within the can during said drying operation and progressively while said air is being introduced.

23. In a drying apparatus for cans and the like, the combination of a plunger arranged to nearly fill the space within the can, a can holder for causing the plunger to progressively occupy said space, means for causing a flow of air through said space, and means for causing the flow of air to begin as the plunger begins to occupy said space.

24. The combination of a can carrier, plungers thereon adapted to restrict the space within the cans for the drying action of air currents, can holders movable endwise, on the carrier, to cause said action of the plungers, means for actuating said holders to apply and remove cans to and from said plungers, means for causing said air currents, means for automatically placing the cans in communication with and cutting them off from said air currents during the movement of the carrier, and means for actuating the carrier.

25. In a drying apparatus for cans and the like, the combination of a body arranged to produce a narrow annular air space around the can, means for causing said body to fill such space progressively along the surface of the can, and means for causing a flow of air through and out of said space, to rapidly remove moisture from the can surface.

Signed in the presence of two subscribing witnesses.

FRED G. FOSS.

Witnesses:
D. F. MENNIS,
GEORGE W. WHEELWRIGHT.